United States Patent [19]

Duggins et al.

[11] 4,159,190
[45] Jun. 26, 1979

[54] LAYDOWN TOOL FOR PLASTIC CROP-IRRIGATION TUBING

[75] Inventors: Ray B. Duggins, Chadds Ford, Pa.; Peter G. Mackauf, San Diego, Calif.; Charles J. McLaughlin, III, Wilmington, Del.

[73] Assignee: E. I. Du Pont de Nemours and Company, Wilmington, Del.

[21] Appl. No.: 896,450

[22] Filed: Apr. 14, 1978

[51] Int. Cl.$^2$ ............................................. F16L 1/00
[52] U.S. Cl. ............................................. 405/179
[58] Field of Search ............... 61/72.6, 105; 405/179, 405/180, 181, 182, 183

[56] References Cited

U.S. PATENT DOCUMENTS

| | | | |
|---|---|---|---|
| 2,118,553 | 5/1938 | Garlinger | 61/72.6 |
| 2,722,181 | 11/1955 | Hash | 405/181 |
| 3,391,545 | 7/1968 | Linneman | 61/72.6 |

FOREIGN PATENT DOCUMENTS 1188363  3/1959  France ...................... 61/72.6

Primary Examiner—Jacob Shapiro

[57] ABSTRACT

This invention provides apparatus and a method for laying flexible irrigation tubing underground, the apparatus comprising a plow attached to a frame, means located on the frame to support and unreel a spool of flexible tubing, a rigid tube affixed to the frame adapted to accept the flexible tubing at its upper end and bent so that its lower portion extends rearward of the plow generally parallel to the ground and in the trench dug by the plow, hillers affixed to the frame adapted to force the dirt plowed by the plow back into the formed trench immediately behind the rigid tube, and a compacting means attached to and trailing the hillers to compact the dirt into the trench, provided that the trailing end of the rigid tube extends rearward to a point behind the point of compaction of the compacting means such that, in operation, as the apparatus is pulled across the ground and the flexible tubing is drawn into the rigid tube, the flexible tubing exits the trailing end of the rigid tube and is laid into the underground tunnel which is formed by operation of the component parts of the apparatus.

5 Claims, 3 Drawing Figures

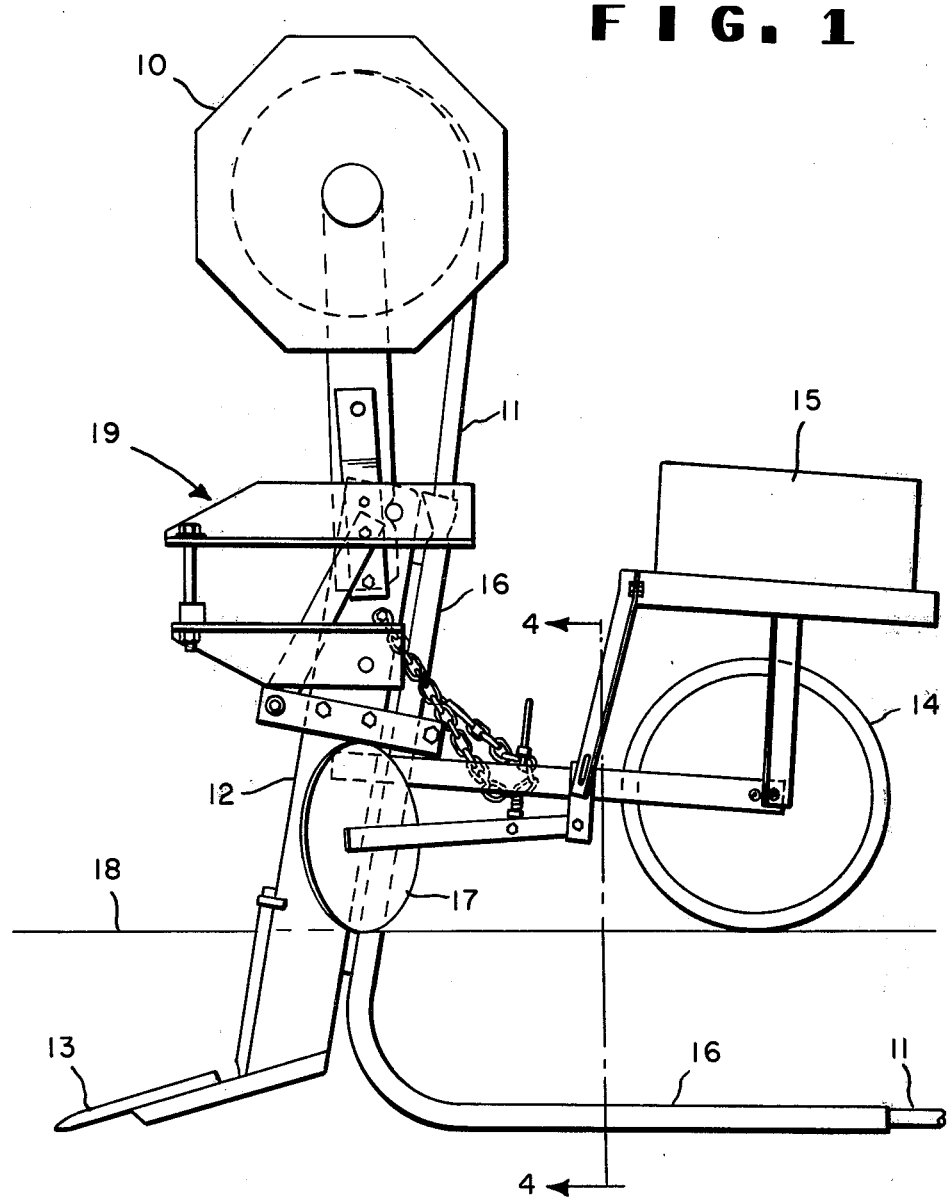

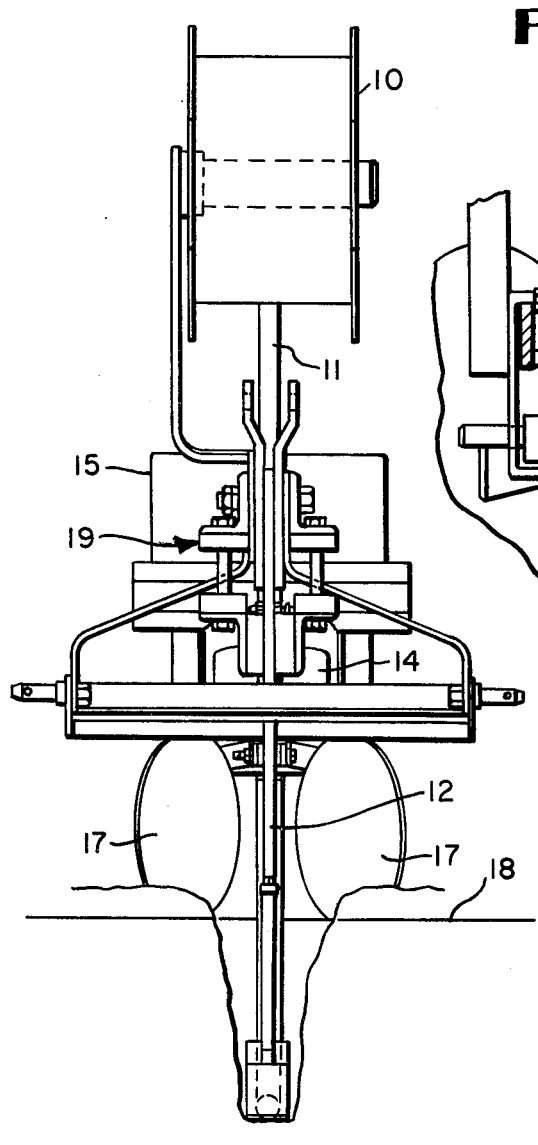
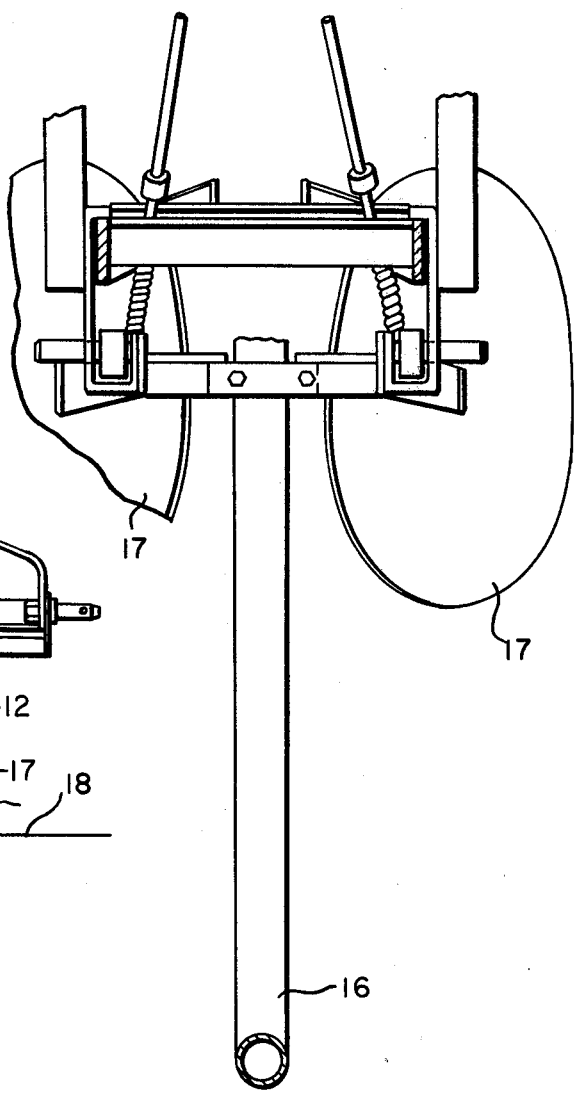

LAYDOWN TOOL FOR PLASTIC CROP-IRRIGATION TUBING

TECHNICAL FIELD

This invention concerns a method and apparatus for laying flexible irrigation tubing below the soil surface, especially below tillage level and simultaneously compacting the soil on top of the tubing so that the tubing can be used for many years without collapse.

BACKGROUND ART

Irrigation of crops by implanting porous plastic tubing in the soil and pumping water and nutrients into the tubing, which then permeate into the soil, is known. The water and nutrients pass through the walls of the tubing into the ground and irrigate and fertilize the crops.

A. A. Stone and H. E. Gulvin, in "Machines for Power Farming," Third Edition, John Wiley and Sons (1977) p. 188, describe apparatus for laying flexible plastic pipe into the soil comprising a subsoiler unit pulled by a tractor and pulling a mole behind the subsoiler. The mole is described to be oval-shaped, varying in diameter from 3-8 inches (7-20 cm). As the mole is pulled behind the subsoiler point, it leaves a tunnel which is said to have been known to last for up to eight years under "ideal" circumstances. To lay plastic piping, this article describes a method in which the pipe is drawn into a tube behind the shank of the subsoiler and is buried by the falling earth.

A problem which has existed using this prior method and apparatus is that most fields are often subjected to circumstances and conditions which are far from "ideal," and flexible tubing collapses under either the weight of the earth or the weight of heavy equipment riding over the soil above the tubing. When collapsed, the tubing can no longer be used and must be replaced. This invention overcomes this problem.

BRIEF DESCRIPTION OF DRAWINGS

FIG. 1 is a side view of the apparatus of this invention.

FIG. 2 is a front view of the apparatus of this invention.

FIG. 3 is a rear view, taken at section "A—A" of FIG. 1.

DISCLOSURE OF INVENTION

This invention provides apparatus and a method for laying flexible tubing underground. The apparatus comprises a chisel plow or other suitable plow attached to a frame, means located on the frame to support and unreel a spool of flexible tubing, a rigid tube affixed to the frame adapted to receive the flexible tubing at its upper end and shaped or bent so that its lower portion extends rearward of the plow generally parallel to the ground and in the trench dug by the plow, one or more hillers depending on plow design affixed to the frame adapted to force the dirt plowed aside by the plow back into the formed trench over the rearward portion of the rigid tube, and a compacting wheel plow board or other suitable means attached to and trailing the hillers to compact the dirt into the trench, provided that the trailing end of the rigid tube extends rearward to a point behind the point of compaction by the compacting means such that, in operation, as the apparatus is pulled across the ground and the flexible piping is drawn into the rigid tube, the piping exits the trailing end of the rigid tube and is laid into the underground tunnel which is formed by operation of the component parts of the apparatus. The exposed end of the flexible tubing must be anchored to pull the piping off its reel and through the rigid tube as the apparatus is moved forward over the ground.

Referring now to FIG. 1 which shows a preferred embodiment of the apparatus of this invention including chisel plow 13 digging a trench below ground level 18, the plow being attached to frame 12 which supports means for holding and unreeling flexible irrigation tubing 11 from spool 10, and feeding the flexible tubing 11 into rigid tube 16. Tube 16 is generally made of metal, preferably stainless steel, and is shaped or bent such that the lower portion of tube 16 lays inside the trench being formed by chisel plow 13. Tube 16 is adapted to receive flexible tubing 11 from spool 10, the flexible tubing 11 exiting the rigid tube 16 at a point behind the assembly and laying in the tunnel formed by tube 16. To form this tunnel, hillers 17 force the plowed dirt back into the trench at a point just behind frame 12, and compacting wheel 14 compacts this dirt on top of rigid tube 16. Weight 15 or some other suitable means may be placed on top of compacting wheel 14 to provide additional compacting force if needed. The entire assembly is pulled by a tractor or other means and is attached thereto by means of a hitch 19.

FIG. 2, the front view of the apparatus of this invention, more clearly shows the trench being formed by plow 13 and compacting wheel 14 compacting the dirt which is pushed back into the trench by hillers 17 as tubing 11 is laid.

FIG. 3 shows in detail the rear view of hillers 17 and rigid tube 16 taken at section "A—A".

Sizes and dimensions of the various components of the apparatus may vary for different types of terrain, and are readily determined by one skilled in the art. Inside diameters of flexible irrigation tubing generally range from 0.45 inch (1.14 cm) to about 0.8 inch (2 cm.). The inside diameter of the rigid metal tube must be larger than the outside diameter of the plastic tube and generally ranges from 0.75 inch (1.9 cm) to 1.5 inch (3.8 cm). The wall of the rigid metal pipe must be thick enough to withstand the compaction forces generated by the compacting wheel in compacting the dirt over this tube. Typically this wall thickness is 0.05 to 0.25 inch (0.13 to 0.64 cm). The size of the compacting wheel and the weight of block 15 required to compact the dirt will vary with the consistency and porosity of the soil being plowed, and are readily determined by one skilled in the art. In one application using Viaflo ® porous plastic irrigation tubing, a compacting wheel 18 inches (45.7 cm) in diameter and 6 inches (15 cm) wide supporting a 100 pound (45 Kg) block was entirely satisfactory.

The key to the successful use of this apparatus lies in the fact that the trailing end of rigid tube 16, where the flexible tubing 11 exits, extends behind the point of compaction of compacting wheel 14. By this technique, the trailing portion of the rigid tube, which is strong enough radially to withstand the compacting without collapsing, is dragged through the already-compacted tunnel into which the plastic tube is laid. It is unexpected that, using this apparatus and technique, the compacted tunnel so formed is structurally sound and even heavy equipment such as tractors driving over such tunnel will not collapse it and pinch off the flexible tubing inside.

The apparatus and technique disclosed herein is useful for laying flexible tubing underground and is particularly suited in the agricultural industry for laying porous, flexible, plastic irrigation tubing at a depth of 10 to 18 inches (25.4 to 45.7 cm). The apparatus and technique disclosed herein also is useful for laying other types of flexible, collapsible tubing in the ground such as supply lines operated under low pressure ordinarily requiring still wall tubing.

I claim:

1. Apparatus for laying collapsible flexible tubing underground without collapsing said collapsible flexible tubing comprising:
    (a) a plow attached to a frame,
    (b) said frame having means to support a rotatable spool of collapsible flexible tubing,
    (c) a rigid tube having inside diameter larger than the outside diameter of said flexible tubing, affixed to said frame and adapted to receive said flexible tubing at its upper end and shaped so that the lower portion of the rigid tube extends rearward of said plow generally parallel to the ground and in a trench dug by said plow,
    (d) one or more hillers affixed to said frame and adapted to force dirt plowed by said plow back into the trench so formed above said rigid tube and
    (e) a compacting means attached to and trailing said frame adapted to compact dirt forced into the trench by said one or more hillers into said trench, and around said rigid tube said rigid tube extending rearward to a point beyond the point of compaction of said compaction means.

2. The apparatus of claim 1 wherein the plow is a chisel plow.

3. The apparatus of claim 2 wherein said compacting means is a wheel.

4. The apparatus of claim 3 wherein there are two hillers.

5. The apparatus of claim 4 wherein the hillers are rotatable discs.

* * * * *